United States Patent
Pusic

[19]

[11] Patent Number: 5,924,950
[45] Date of Patent: Jul. 20, 1999

[54] EVEN INCREMENT, NON-OVERLAPPING BICYCLE TRANSMISSION

[76] Inventor: Pavo M Pusic, 52 Brooklake Rd., Florham Park, N.J. 07932

[21] Appl. No.: 08/944,612

[22] Filed: Oct. 6, 1997

[51] Int. Cl.[6] .................................................. F16H 37/02
[52] U.S. Cl. ...................... 475/207; 475/209; 475/287; 74/362
[58] Field of Search ................... 475/207, 209, 475/218, 286, 287; 74/362, 363

[56] References Cited

U.S. PATENT DOCUMENTS

| Re. 32,125 | 4/1986 | Von Kaler et al. | 74/363 X |
|---|---|---|---|
| 2,086,563 | 7/1937 | Lewis | 74/363 |
| 4,674,346 | 6/1987 | Hiraiwa | 74/363 X |
| 4,973,297 | 11/1990 | Bergles | 475/289 |
| 5,099,712 | 3/1992 | Douglass | 74/363 |
| 5,443,279 | 8/1995 | Nurnberger | 475/298 X |
| 5,445,573 | 8/1995 | Nurnberger | 475/298 |
| 5,527,230 | 6/1996 | Meier-Burkamp | 475/298 X |
| 5,556,354 | 9/1996 | Meier-Burkamp | 475/275 |
| 5,562,563 | 10/1996 | Shoge | 475/289 X |
| 5,785,625 | 7/1998 | Matsuo et al. | 475/286 X |

*Primary Examiner*—Dirk Wright
*Assistant Examiner*—Peter T. Kwon

[57] ABSTRACT

A transmission for transmitting power from an input shaft to a driving wheel and changing rotating speed ratios is disclosed. The transmission comprises a drive shaft, a set of drive gears, a driven shaft, a set of driven gears, one counter gear, one return gear including a hub, a planetary gear and sprocket assembly, and a braking mechanism which alternates the operation of the planetary gear. By alternately engaging the different drive gears, the transmission enables the change of an input rotating speed and by stopping the ring gear in the planetary assembly it further multiplies the change of the input rotating speed. Within a very compact and user-friendly design, the transmission provides a fill range of speeds and enables smooth power flow resulting in the decrease of power loss in pedal propelled vehicles.

12 Claims, 3 Drawing Sheets

EVEN INCREMENT, NON-OVERLAPPING BICYCLE TRANSMISSION

BACKGROUND OF THE INVENTION

A bicycle transmission is used for changing the ratio between a crank operating speed and a driving wheel operating speed to best meet each particular driving situation. Bicycle transmissions known in the prior art use different size sprockets (chainwheels) and a driving chain to transmit a pedaling force to a driving (rear) wheel. They use two sets of sprockets, wherein one set of sprockets is mounted on a crank spindle and another on a rear axle. The chain rotates on one of the front sprockets and one of the rear sprockets and is displaced by derailleurs from one sprocket to another in order to change the driving wheel operating speed. The front derailleur is located proximate to the front sprockets and used to displace the chain on these sprockets. The rear derailleur is located proximate to the rear sprockets and used to displace the chain on these sprockets.

In order to change the speed, the chain has to be displaced from at least one sprocket which causes interruptions in the power transmitting process and results in power loss. Due to their size and position the chain and sprockets cannot be properly lubricated without creating negative effects and are often exposed to environmental damage. The transmissions of the prior art do not allow an identical ratio of speed increase/decrease between two neighboring speeds, thereby creating negative effects regarding power flow. A rear set of sprockets (cogs' cassette) requires both chainstays and seatstays to be spaced wide apart to accommodate for the width of the sprockets which, in turn, creates negative aerodynamic effects. In sum, the transmissions of the prior art do not enable an efficient and uninterrupted flow of the pedaling force and negatively influence the aerodynamic properties of the bicycle.

SUMMARY OF THE INVENTION

The present invention comprises one gear box and a planetary gear located within a bottom bracket area and connected to a chain sprocket. The gear box comprises two sets of gears mounted on two shafts. One set of gears, hereinafter referred to as drive gears, is mounted on a crank spindle which serves as a power input (drive) shaft and another set of gears, hereinafter referred to as drive gears, is mounted onto the shaft which serves as a driven (counter) shaft. Each set comprises gears which have different diameters and are mounted to be in a constant-mesh position, wherein the largest drive gear meshes with the smallest driven gear and vice versa. The gears mounted onto the drive shaft are firmly connected to this shaft and all rotate at the same speed as the shaft. The gears mounted onto the driven shaft rotate independently and their rotating speed is proportional to the difference of their diameters with respect to the diameters of the corresponding drive gears.

The driven shaft is drilled through and houses a shifting mechanism which alternately engages one of the driven gears. When engaged, the driven gear is connected to the driven shaft and forces the shaft to rotate at the same speed. Each pair of gears (one drive and corresponding driven gear) produces a rotating speed which is different from one which can be produced by two neighboring pairs of gears. One (counter) gear is firmly connected to the driven shaft and always rotates at the same speed as this shaft. This gear permanently meshes with and drives one (return) gear which is rotatably mounted on the drive shaft. The gear which is rotatably mounted on the drive shaft has a hub which extends along the drive shaft into a inner section of a chain sprocket and a inner section of a planetary gear. The hub drives either the sprocket or the planetary gear as explained later in a detailed description of the preferred embodiment.

The present invention enables a chain to transmit a pedaling force without being displaced from one sprocket to another and, therefore, eliminates disadvantages related to existing power transmission systems. The chain is constantly mounted onto two sprockets and a shifting process is performed smoothly and efficiently. All major components are encased and can be properly lubricated at all times. Also, almost every component is performing only a one-way rotating motion which creates the smallest friction and wear, thereby enabling a maintenance-free operation.

A smooth and uninterrupted shifting process and low friction create minimum power loss and a relatively small volume enables excellent aerodynamic properties. A shifting process can be performed by a single shifting cable or an electric step motor and produces a wide variety of identical shifting ratios. This transmission is also aesthetically pleasing, eliminates chain slipping problems inherent to bicycles with suspension systems, and regarding weight and volume does not exceed the parameters of the existing power transmitting systems.

DETAILED DESCRIPTION OF THE PREFERRED EMBODIMENT

Figure 1:
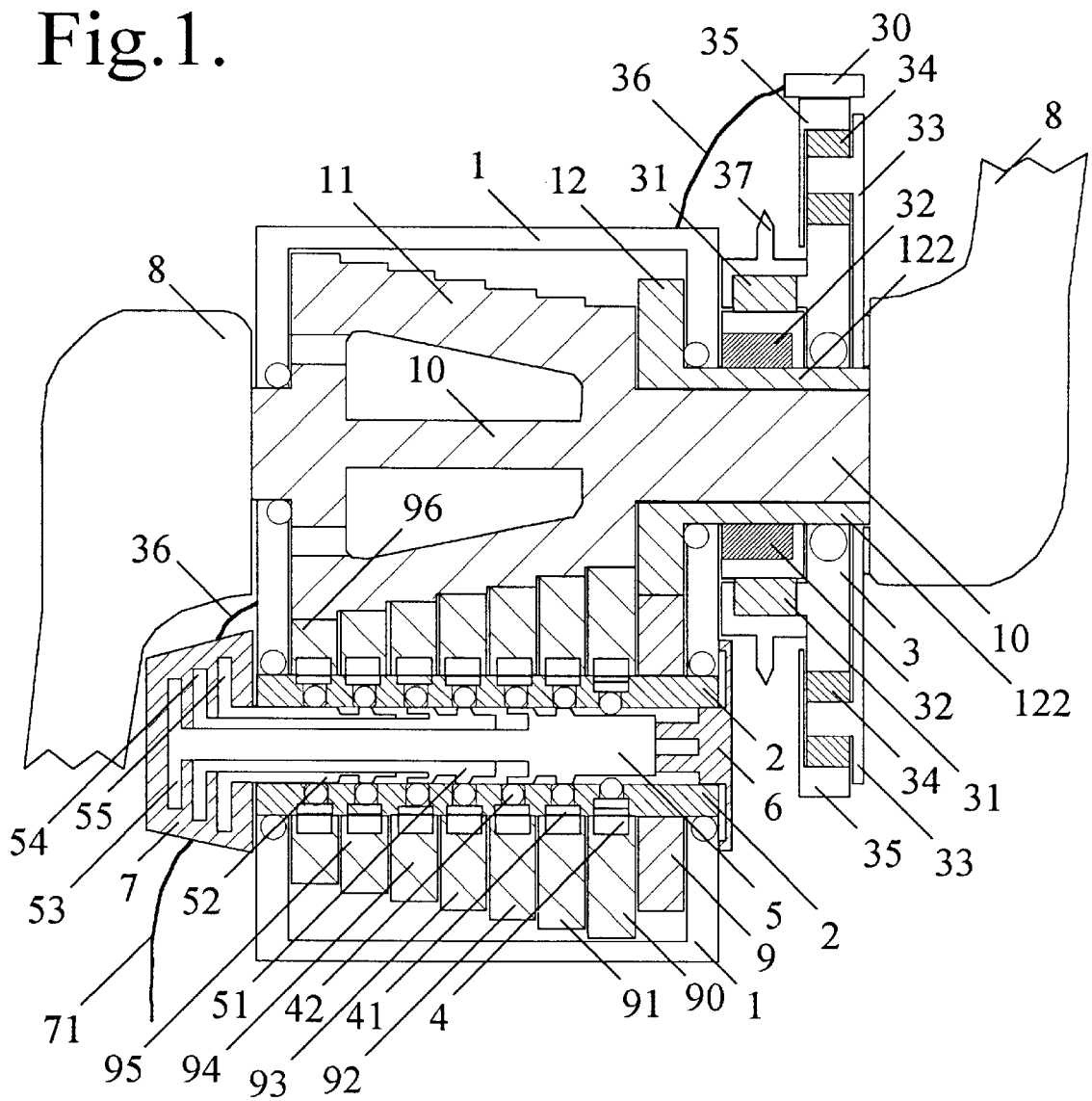
FIG. 1 is the top view of the invention showing the arrangement of the drive and driven gears, drive and driven shafts, a counter gear, a return gear, a shifting mechanism, and a planetary gear.

As shown in FIG. 1, the present invention comprises one set of gears 11, hereinafter identified as drive gears, mounted onto a drive shaft 10 and one set of gears 90–96, hereinafter identified as driven gears, mounted onto a driven (counter) shaft 2. Both sets of gears 11 and 90–96 are positioned so as to enable that each of the drive gears 11 constantly meshes with a corresponding driven gear 90–96. The drive gears 11 have different diameters and all of them are firmly attached to the drive shaft 10. The driven gears 90–96 also have different diameters and each of these gears 90–96 is mounted in a manner which allows a completely independent rotation around the shaft 2. The driven shaft 2 and the drive shaft 10 are rotatably mounted within the housing 1 and only the end sections of the drive shaft 10 extend outside the housing 1. As shown in FIG. 1, two cranks 8 are mounted onto the end sections of the drive shaft 10.

Figure 2:
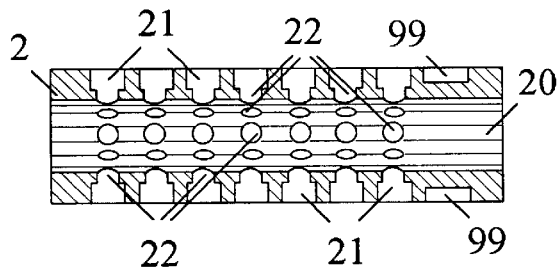
FIG. 2 is the longitudinal cut-away view of the driven shaft.
Figure 3:
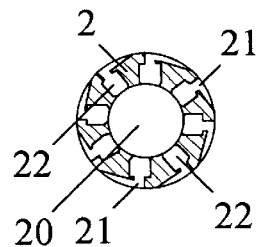
FIG. 3 is the lateral cut-away view of the driven shaft.
Figure 4:
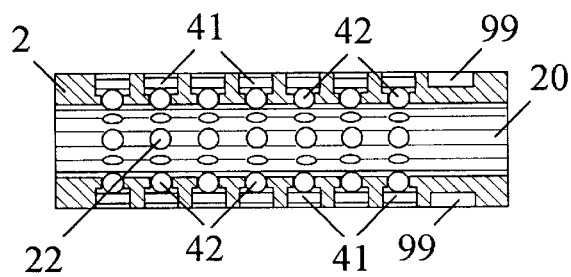
FIG. 4 is the longitudinal cut-away view of the driven shaft with intermediate balls and key-displacing pins.

One counter gear 9 is mounted onto the driven shaft 2 as shown in FIG. 1, and it 9 is firmly connected into keyways 99 of the shaft 2 shown in FIGS. 2 and 4. One return gear 12, shown in FIG. 1, is mounted onto the drive shaft 10. This gear 12 has a hub 122 which encircles one of the end sections of the drive shaft 10 and is able to freely rotate around the shaft 10. A planetary gear and sprocket assembly, which incorporates a sun gear 3, a chain driving sprocket 37, planet gears 34, a ring gear 35, a planet carrier 33, and two over-running clutches 31 and 32, is mounted onto the hub 122 of the return gear 12 as shown in FIG. 1. The sun gear 3 is mounted onto the hub 122 in a manner which allows it 3 to freely rotate in any direction around the hub 122. The over-running clutches 31 and 32 are able to freely rotate only in one direction as explained later in this specification. The planet carrier 33 is firmly connected to the hub 122 and always rotates together with the hub 122. A brake 30 is located next to the ring gear as shown in FIG. 1 and used to stop the rotation of the ring gear 35 when required by the process of the invention as explained later in this specification.

Figure 5:
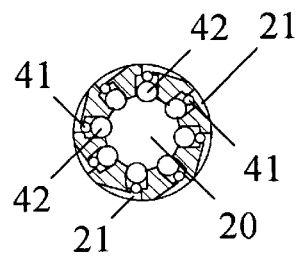
FIG. 5 is the lateral cut-away view of the driven shaft with intermediate balls and key-displacing pins.
Figure 6:
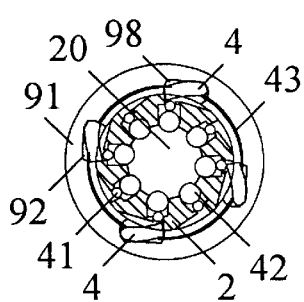
FIG. 6 is the lateral cut-away view of the driven shaft and the driven gear in the engaged position.
Figure 7:
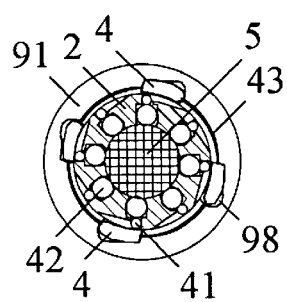
FIG. 7 is the lateral cut-away view of the driven shaft and the driven gear in the disengaged position.

As shown in FIGS. 1, 2, 3, 4, 5, 6, and 7, the driven shaft 2 has a longitudinal opening 20 and a plurality of lateral openings 21 and 22. As shown in FIGS. 1, 7, 11, and 12, the longitudinal opening 20 houses a plurality of shifting plungers 5, 51, and 52, and a plunger holder 6 shown in FIGS. 1, 11, 12, and 14. The lateral openings 22 house intermediate balls 42 and the lateral openings 21 house rollers 41 as shown in FIGS. 1, 5, 6, 7, 11, and 12. The balls 42 and rollers 41 are able to travel from the retracted position, as shown in FIGS. 4, 5, and 6, into the extended position as shown in FIG. 7. When the balls 42 are pushed outwards, they 42 push the rollers 41 in the same direction and, consequently, the rollers 41 extend to the outer circumference of the counter shaft 2 as shown in FIG. 7. The plungers' holder 6, shown in FIGS. 1, 11, 12, and 14 is inserted through the shifting plungers 5, 51, and 52 and firmly connected to the housing 1 as shown in FIG. 1. Its function is to prevent rotation of the plungers 5, 51, and 52 during the shifting process and, thereby, ensure their linear motion.

Figure 11:
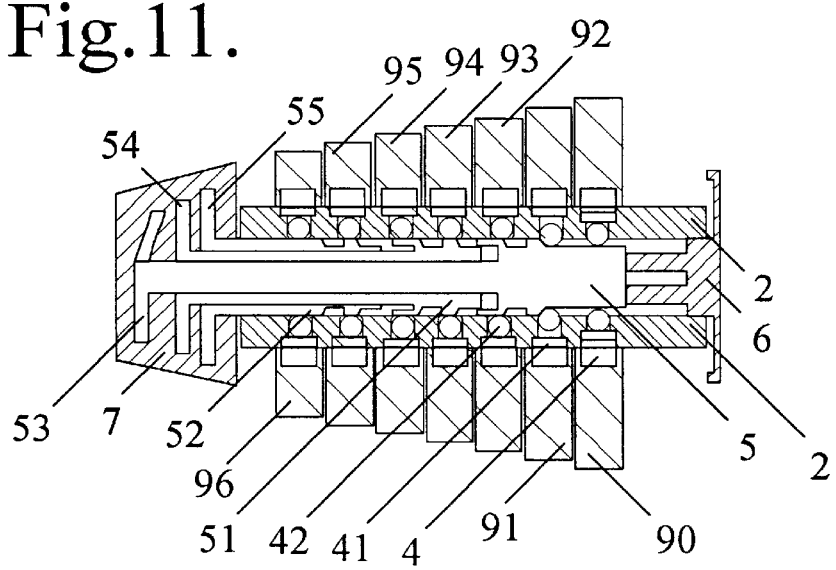
FIG. 11 is the longitudinal cut-away view of the driven shaft, driven gears, and the shifting assembly showing the shifting assembly position in the second speed.
Figure 12:
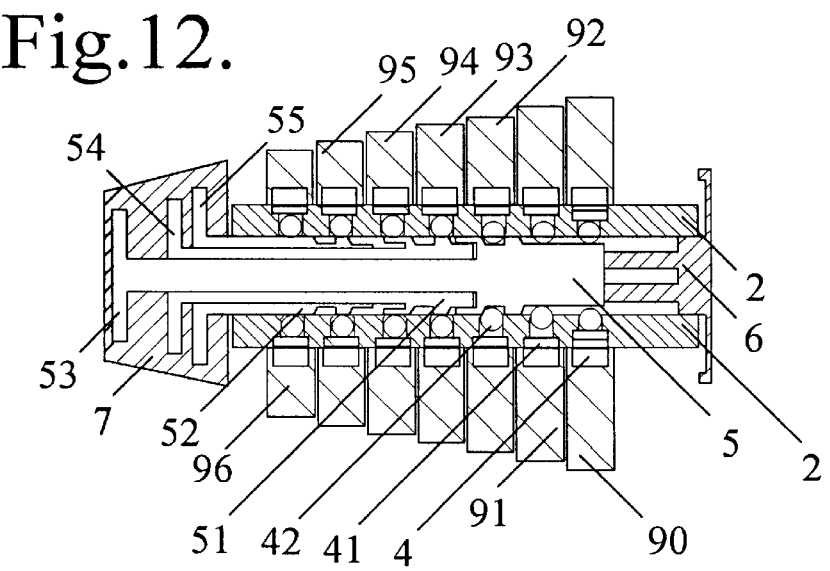
FIG. 12 is the longitudinal cut-away view of the driven shaft, driven gears, and the shifting assembly showing the shifting assembly position in the third speed.

The shifting plungers 5, 51, and 52 are located within the longitudinal opening 20 of the driven shaft 2 and each of them has sections which have different diameters as shown in FIGS. 1, 11, 12, and 15. The circumference of the sections having a larger diameter 56 corresponds to the circumference of the longitudinal opening 20 of the counter shaft 2 and these sections 56 displace the balls 42 and rollers 41 into their extended position as shown in FIG. 7. The circumference of the sections having a smaller diameter is smaller then the circumference of the longitudinal opening 20 of the counter shaft 2 and enables the balls 42 and rollers 41 to return into their retracted position as shown in FIGS. 4, 5, and 6. The shifting plungers 5, 51, and 52 are mounted onto each other so that the middle plunger 51 encircles the inner plunger 5 and that the external plunger 52 encircles the middle plunger 51 as shown in FIGS. 1, 11, and 12. The plungers 5, 51, and 52 extend through one end of the counter shaft 2 and each of them has an end extension 53, 54, and 55 as shown in FIGS. 1, 11, 12, and 15. The end extensions 53, 54, and 55 of the plungers 5, 51, and 52 are inserted into a shifter 7 as shown in FIGS. 1, 11, and 12. The shifter 7, shown in FIGS. 1, 11, 12, and 13, has internal grooves 73, 74, and 75 shown in FIG. 13. The grooves 73, 74, and 75 house the end extensions 53, 54, and 55 of the plungers and are curved so as to horizontally drive the plungers back and forth through the opening 20 when the shifter 7 is rotated as shown in FIGS. 11 and 12.

Figure 8:
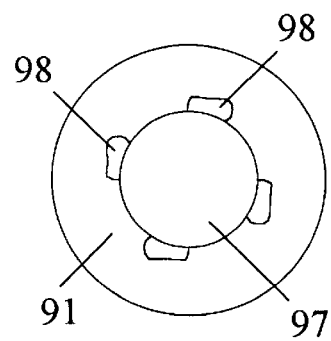
FIG. 8 is the side view of the driven gear.
Figure 9:
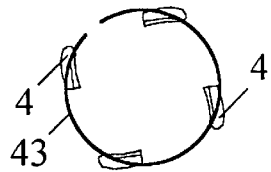
FIG. 9 is the side view of the engaging keys and the tension spring in the engaged position.
Figure 10:
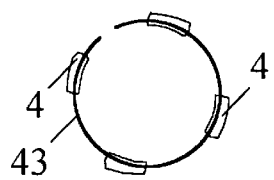
FIG. 10 is the side view of the engaging keys and the tension spring in the disengaged position.

As shown in FIGS. 6, 7, and 8, the driven gears 90–96 have a plurality of notches 98 machined within their inner openings 97. One engaging key 4 is located within each of the notches 98 in a manner which allows the keys 4 to assume either an extended position as shown in FIG. 6 and 9 or a retracted position as shown in FIG. 7 and 10. The keys 4 are mounted onto an tension spring 43, as shown in FIGS. 6, 7, 9, and 10, which forces the keys 4 into the extended position and, consequently, enables the keys 4 to push the rollers 41 and balls 42 into their retracted position as shown in FIG. 6. When the keys 4 are in their extended position, as shown in FIG. 6, they 4 enter rollers' openings 21 and lock the gear 90–96 to the counter shaft 2, thereby forcing the shaft 2 to rotate at the same speed as the corresponding gear 90–96. When the keys 4 are in their retracted position, as shown in FIG. 7, they allow the gear 90–96 and the shaft 2 to rotate at different speeds. The keys 4 also do not exert any influence in the case when the rotating speed of the shaft 2 exceeds the rotating speed of the gear 90–96.

The following description of the process of the invention assumes that the shifting mechanism is positioned so as to result with the lowest (first) speed as shown in FIG. 1. Also, in this position the brake 30 is not blocking the ring gear 35 and this gear 35 can freely rotate in any direction. According to the process of the invention, when the cranks 8 are turned forward they force the drive shaft 10 to rotate in the same direction. Since the drive gears 11 are firmly connected to the drive shaft 10 they also are forced to rotate in the same direction and at the same speed. Due to the constant-mesh position, the drive gears 11 force the driven gears 90–96 to rotate at the speed defined by the difference in diameter between each pair of the drive 11 and driven 90–96 gears. The plungers 5, 51, and 52 are in their ultimate inward position as shown in FIG. 1, and they are displacing the balls 42 and rollers 41 as shown in FIG. 1. In this instance only the balls 42 and rollers 41 corresponding to the largest driven gear 90 are not displaced from their inward position, shown in FIG. 5, and 6, and only the keys 4 corresponding to the largest driven gear 90 are able to engage the counter shaft 2 as shown in FIG. 6.

According to the process of the present invention, all of the driven gears 91–96 whose corresponding balls 42 and rollers 41 are displaced outwards by the plungers 5, 51, and 52, as shown in FIG. 7, are freely turning around the counter shaft 2 because the keys 4 corresponding to these gears 91–96 cannot enter the lateral openings 21 and engage the shaft 2. Consequently, only the largest driven gear 90 is connected to the shaft 2 and forces the shaft 2 to rotate at the same speed. Since the largest driven gear 90 meshes with the smallest drive gear 11, this situation results in the slowest rotating speed, hereinafter referred to as the first speed. The counter gear 9, which is firmly connected to the counter shaft 2, transmits the rotating force of the counter shaft 2 onto the return gear 12 which now rotates in the same direction as the drive shaft 10.

The rotating force is further transmitted by the return gear's hub 122 which engages the one-way over-running clutch 32. The clutch 32 is able to turn faster but not slower than the hub 122 and, therefore, is forced to turn at the same speed as the hub 122. The over-running clutch 32 further engages the one-way over-running clutch 31 which is also able to turn faster but not slower than the clutch 32. The clutch 31 engages the chain sprocket 37 which, in turn, is forced to turn at the same speed and in the same direction as the hub 122 of the return gear 12. The rotating force is further transmitted to the driving wheel by a chain mounted onto the sprocket 37. During the above described power transmitting process the planetary gear assembly simply turns around at the same speed as the hub 122 and does not perform any action. Due to the fact that the sun gear 3 is firmly connected to the clutch 31 and that the planet carrier 33 is firmly connected to the hub 122, the entire planetary gear assembly turns as a single unit and does not create any friction losses.

Figure 13:
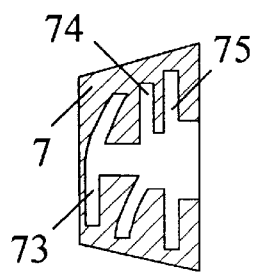
FIG. 13 is the cut-away view of the shifter.
Figure 14:
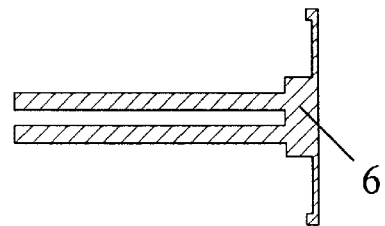
FIG. 14 is the cut-away view of the plungers' holder.
Figure 15:
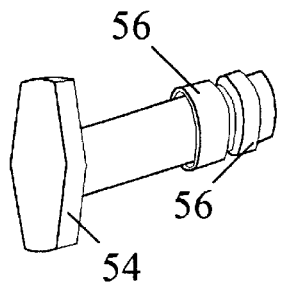
FIG. 15 is the perspective view of the plunger.

Shifting into a higher/slower speed is performed by rotating the shifter 7 by a certain predetermined number of degrees which is performed by a shifting cord 71 connected to the shifter 7. The internal grooves 73, 74, and 75 of the shifter 7 are curved as shown in FIG. 13, and each of them houses one of the plungers' end extensions 53, 54, and 55. According to the process of the present invention, when the shifter 7 is turned by a certain number of degrees, one of the grooves 73, 74, or 75 forces one of the end extensions 53, 54, or 55 to move in accordance with the groove curvature and, thereby, pull/push one of the plungers 5, 51, or 52. Accordingly, the rotary motion of the shifter 7 is alternately translated into the linear motion of one of the plungers 5, 51, or 52. Each of the plungers 5, 51, and 52 is able to move within a length corresponding to two (2) driven gears 90–96 and the plungers are alternately pulled/pushed into one of two possible positions. The grooves 73, 74, and 75 are designed to engage one of the plungers 5, 51, or 52 at the point after the neighboring plunger is driven into an ultimate left/right position.

When shifting from first to second speed is required, the shifter 7 drives the end extension 53 of the plunger 5 through the groove 73 into the position shown in FIG. 11. At this instant, the plunger's 5 position allows the balls 42 and rollers 41 corresponding to the second driven gear 91 to be displaced into their retracted position by the keys 4 corresponding to the second driven gear 91. Consequently, the keys 4 corresponding to the second driven gear 91 are able to enter the lateral openings 21 located in the section covered by the second gear 91 and engage the counter shaft 2 as shown in FIGS. 6 and 11. Since the second driven gear 91 is always turning faster than the first driven gear 90, the shaft 2 starts turning at the speed of the second driven gear 91 and the keys 4 corresponding to the first gear 90 disengage the shaft 2 regardless of the fact that the rollers 41 and the balls 42 corresponding to the first driven gear 90 are able to remain in their retracted position. It is to be mentioned that in every situation when the counter shaft 2 turns faster than any driven gear 90–96, the keys 4 corresponding to that gear 90–96 cannot engage the shaft 2.

Shifting into the third speed is performed by driving the plunger 5 into the position as shown in FIG. 12, wherein the shifter drives the end extension 53 into its ultimate left position. Consequently, the keys 4 of the third driven gear 92 are able to displace the balls 42 and rollers 41 and enter the lateral openings 21 as shown in FIGS. 6 and 12. This causes the third driven gear 92 to engage the shaft 2 and the second driven gear 91 to disengage the shaft 2 which starts rotating faster than the second driven gear 91. The process of shifting up to the seventh speed (when the gear 96 is engaged) is performed by driving the plungers 51 and 52 in the same manner as described above for the plunger 5. Shifting into a lower gear is performed by driving the plunger back into the previous position, for example, driving the plunger 5 from the position shown in FIG. 12 into the position shown in FIG. 11. When driven one step backwards, every plunger forces the balls 42 and rollers 41 into the extended positions, shown in FIG. 7, which, in turn, displaces the keys 4 from the lateral openings 21 and disengages the previously engaged driven gear 90–96. In every case, as soon as the faster gear is disengaged, the shaft 2 slows down and enables the keys 4 of the slower gear to connect this (slower) gear to the shaft 2.

The process of driving the plungers 5, 51, and 52, as explained above, produces the first seven speeds. Shifting into the eighth speed is performed by driving all plungers back into the starting position as shown in FIG. 1, i.e. into the same position as for the first speed. Simultaneously, the shifter pulls the cord 36 which, in turn, activates the brake 30 that stops rotation of the ring gear 35. As known from the prior art, when the ring gear 35 is blocked (its rotation stopped) the planet carrier 33 (which is firmly connected to the hub 122) starts forcing the planet gears 34 to rotate inside the ring gear 35, which results in faster rotation of the sun gear 3 than the rotation of the hub 122. Since the sun gear 3 is firmly connected to the clutch 31, the speed of the sprocket 37 is increased with respect to the speed of the hub 122. An increased rotating ratio of the sun gear 3 is defined by a difference between the number of teeth of the ring gear 35 and number of teeth of the sun gear 3. According to the process of the invention, this ratio is settled at the point wherein the sun gear's 3 rotating speed is higher than the hub's 122 rotating speed when the fastest driven gear 96 is connected to the shaft 2 and the planetary gear set is allowed to rotate, i. e. the sun gear's 3 rotation is faster than the seventh speed and represents the eighth speed.

As soon as the sun gear 3 starts rotating faster than the hub 122, the over-running clutch 31 disengages the cover of the over-running clutch 32. Further up- and down-shifting is performed identically as explained above for the first seven speeds with the ring gear 35 being blocked all the time. Shifting back into seventh speed is performed by driving all of the plungers 5, 51, and 52 into their ultimate left position and simultaneously releasing the brake 30 on the ring gear 35. As soon as the ring gear 35 is again allowed to rotate, the rotating speed of the sprocket 37 becomes equal to the rotating speed of the hub 122, i. e. the transmission can produce only seven lower speeds. In sum, seven lower speeds are produced when the planet carrier 33 cannot force the planet gears 34 to rotate inside the ring gear 35 and the seven higher speeds are produced when the planet carrier 33 forces the planet gears 34 to rotate inside the ring gear 3, thereby forcing the sun gear 3 to rotate faster than the hub 122.

It is to be understood that the number of driven gears and possible speeds specified in the above description is defined only for the purpose of illustration. It is also to be understood that the shifter 7 can be operated by other means, such as an electric step motor.

As obvious from the above description, the present invention discloses the transmission which will eliminate drawbacks inherent to the transmissions known in the prior art. While having a compact design, this transmission will enable smooth power flow resulting in smaller power loss and much more convenient application in any type of pedal powered vehicle.

It is to be understood that the present invention has been described in relation to the particular embodiment, herein chosen for the purpose of illustration, and that the claims are intended to cover all changes and modifications, apparent to those skilled in the art, which do not constitute departure from the scope and spirit of the invention.

What is claimed is:

1. A transmission for changing a ratio between a power input shaft operating speed and a driving wheel operating speed in pedal propelled vehicles, the transmission comprising:

a housing;

a drive shaft installed in the housing, the drive shaft having first and second ends;

a set of drive gears having different diameters, the drive gears mounted and firmly attached to the drive shaft;

a driven shaft installed in the housing, the driven shaft having first and second ends;

a plurality of driven gears independently mounted on the driven shaft, the plurality of driven gears being able to independently rotate around the driven shaft and positioned to constantly mesh with the set of drive gears;

a counter gear, the counter gear firmly connected to the driven shaft proximate to the housing;

a return gear, the return gear including a hub and being mounted on the drive shaft so as to be able to rotate freely with respect to said drive shaft and to constantly mesh with the counter gear mounted on the driven shaft;

a planetary gear and sprocket assembly, the planetary gear and sprocket assembly mounted onto the hub of the return gear and comprising a sun gear, a plurality of planet gears, a planet carrier, a ring gear, a plurality of one-way clutches, and a chain sprocket, wherein the sun gear and one of said one-way clutches are rotatably mounted onto the hub and wherein the planet carrier is firmly connected onto the hub;

a braking means for stopping the ring gear, the braking means located proximate to the ring gear;

a plurality of engaging keys, the engaging keys located within the driven gears;

a plurality of tension springs, the tension springs located within driven gears;

a plurality of first lateral openings within the driven shaft, said lateral openings located proximate to the external circumference of the driven shaft;

a plurality of first gear disengaging means, said first gear disengaging means located within the first lateral openings;

a longitudinal opening within the driven shaft, said longitudinal opening extending through the driven shaft and having first and second ends;

a plurality of second lateral openings within the driven shaft, said lateral openings located proximate to the longitudinal opening of the driven shaft;

a plurality of second gear disengaging means, said second gear disengaging means located within the second lateral openings;

a plurality of shifting means, said shifting means located within the longitudinal opening and extending through the second end of the longitudinal opening;

a shifter for driving the shifting means, the shifter located proximate to the second end of the longitudinal opening and attached to the shifting means;

a means for connecting the shifter to the braking means for stopping the ring gear;

a means for operating the shifter;

a means for holding the shifting means, said means extending through the first end of the longitudinal opening and being connected to the housing.

2. The transmission of claim 1, wherein each of the drive gears has a different diameter so as to form the set of drive gears in a conical shape.

3. The transmission of claim 1, wherein each of the driven gears has a different diameter so as to form the set of driven gears in a conical shape.

4. The transmission of claim 1, wherein the driven gear having the largest radius meshes with the drive gear having the smallest radius.

5. The transmission of claim 1, wherein the sun gear and one of the one-way clutches are made as a single unit.

6. The transmission of claim 1, wherein the planetary gear and sprocket assembly is mounted onto the drive shaft proximate to the shaft's first end.

7. A transmission for changing a ratio between the power input shaft operating speed and a driving wheel operating speed, the transmission comprising:

a housing;

a drive shaft installed within the housing, the drive shaft having first and second ends wherein both said ends extend through the housing;

a set of drive gears having different diameters, the drive gears mounted and firmly attached to the drive shaft so as to always rotate at the same speed as said shaft;

a driven shaft installed in the housing, the driven shaft having first and second ends;

a plurality of driven gears rotatably mounted on the driven shaft, the plurality of driven gears being able to independently rotate around the driven shaft and positioned to constantly mesh with the set of drive gears;

a counter gear, the counter gear firmly connected to the driven shaft proximate to the first end of the driven shaft;

a return gear, the return gear including a hub and being mounted on the drive shaft so as to be able to rotate freely with respect to said drive shaft and to constantly mesh with the counter gear mounted on the driven shaft;

a planetary gear and sprocket assembly, the planetary gear and sprocket assembly mounted onto the hub of the return gear proximate to the first end of the drive shaft and comprising a sun gear, a plurality of planet gears, a planet carrier, a ring gear, a plurality of one-way clutches, and a chain sprocket, wherein the sun gear and one of said one-way clutches are rotatably mounted onto the hub and wherein the planet carrier is firmly connected onto the hub;

a means for stopping the ring gear, said means being able to suddenly stop the ring gear;

a plurality of engaging keys, the engaging keys located within the driven gears;

a plurality of tension springs, the tension springs located within driven gears and being able to drive the engaging keys;

a plurality of first lateral openings within the driven shaft, said lateral openings located proximate to the external circumference of the driven shaft;

a plurality of first gear disengaging means, said first gear disengaging means located within the first lateral openings;

a longitudinal opening within the driven shaft, said longitudinal opening extending through the driven shaft and having first and second ends;

a plurality of second lateral openings within the driven shaft, said lateral openings located proximate to the longitudinal opening of the driven shaft;

a plurality of second gear disengaging means, said second gear disengaging means located within the second lateral openings;

a plurality of shifting means, said shifting means being able to displace said second and said first gear disengaging means and having sections located within the longitudinal opening and sections extending through the second end of the longitudinal opening;

a shifter for driving the shifting means, the shifter located proximate to the second end of the longitudinal opening and encircling said sections of the shifting means which extend through the second end of the longitudinal opening;

a means for connecting the shifter to the means for stopping the ring gear, said means driven by the shifter;

a means for operating the shifter;

a means for holding the shifting means, said means extending through the first end of the longitudinal opening and being connected to the housing.

8. The transmission of claim 7, wherein each of the drive gears has a different diameter so as to form the set of drive gears in a conical shape.

9. The transmission of claim 7, wherein each of the driven gears has a different diameter, so as to form the set of driven gears in a conical shape.

10. The transmission of claim 7, wherein the driven gear having the largest radius meshes with the drive gear having the smallest radius.

11. The transmission of claim 7, wherein the sun gear and one of the one-way clutches are made as a single unit.

12. A transmission for changing a ratio between a power input shaft operating speed and a driving wheel operating speed in pedal propelled vehicles, the transmission comprising:

a housing;

a drive shaft installed in the housing, the drive shaft having first and second ends;

a set of drive gears having different diameters, the drive gears mounted and firmly attached to the drive shaft;

a driven shaft installed in the housing, the driven shaft having first and second ends;

a plurality of driven gears independently mounted on the driven shaft, the plurality of driven gears being able to independently rotate around the driven shaft and positioned to constantly mesh with the set of drive gears;

a counter gear, the counter gear firmly connected to the driven shaft proximate to the housing;

a return gear including a hub, wherein the hub encircles the drive shaft and rotates freely with respect to said drive shaft and wherein the return gear is constantly meshing with the counter gear mounted on the driven shaft;

a planetary gear and sprocket assembly, the planetary gear and sprocket assembly mounted onto the hub of the return gear and comprising a sun gear, a plurality of planet gears, a planet carrier, a ring gear, a plurality of one-way clutches, and a chain sprocket, wherein the sun gear and one of said one-way clutches are rotatably mounted onto the hub and wherein the planet carrier is firmly connected onto the hub and able to cause a rotation of the planet gears;

a braking means for stopping the ring gear, wherein said braking means are able to block a rotation of the ring gear;

a plurality of engaging keys, the engaging keys located within the driven gears;

a plurality of tension springs, the tension springs located within driven gears;

a plurality of first lateral openings within the driven shaft, said lateral openings located proximate to the external circumference of the driven shaft;

a plurality of first gear disengaging means, said first gear disengaging means located within the first lateral openings;

a longitudinal opening within the driven shaft, said longitudinal opening extending through the driven shaft and having first and second ends;

a plurality of second lateral openings within the driven shaft, said lateral openings located proximate to the longitudinal opening of the driven shaft;

a plurality of second gear disengaging means, said second gear disengaging means located within the second lateral openings;

a plurality of shifting means, said shifting means located within the longitudinal opening and extending through the second end of the longitudinal opening;

a shifter for driving the shifting means, the shifter located proximate to the second end of the longitudinal opening and attached to the shifting means;

a means for connecting the shifter to the braking means for stopping the ring gear;

a means for operating the shifter;

a means for holding the shifting means, said means extending through the first end of the longitudinal opening and being connected to the housing.

* * * * *